United States Patent
Dubus et al.

(10) Patent No.: US 9,746,098 B2
(45) Date of Patent: Aug. 29, 2017

(54) VALVE OPERATOR ASSEMBLY WITH COMPENSATING ACTUATOR

(71) Applicant: AKTIEBOLAGET SKF, Gothenburg (SE)

(72) Inventors: Jérôme Dubus, La Riche (FR); Christian Boch, Chambery (FR)

(73) Assignee: AKTIEBOLAGET SKF, Gothenburg (SE)

( * ) Notice: Subject to any disclaimer, the term of this patent is extended or adjusted under 35 U.S.C. 154(b) by 73 days.

(21) Appl. No.: 14/904,139

(22) PCT Filed: Jul. 19, 2013

(86) PCT No.: PCT/EP2013/065312
§ 371 (c)(1),
(2) Date: Jan. 11, 2016

(87) PCT Pub. No.: WO2015/007340
PCT Pub. Date: Jan. 22, 2015

(65) Prior Publication Data
US 2016/0146372 A1   May 26, 2016

(51) Int. Cl.
*F16K 31/50* (2006.01)
*F16H 25/22* (2006.01)
*F16K 3/30* (2006.01)

(52) U.S. Cl.
CPC ......... *F16K 31/50* (2013.01); *F16H 25/2252* (2013.01); *F16K 3/30* (2013.01); *F16K 31/508* (2013.01)

(58) Field of Classification Search
CPC .......... F16K 31/50; F16K 3/30; F16K 31/508; F16H 25/2252

USPC ......... 251/214–227, 229, 264–276; 74/89.42
See application file for complete search history.

(56) References Cited

U.S. PATENT DOCUMENTS

| | | | |
|---|---|---|---|
| 1,294,112 A | | 2/1919 | Keeler et al. |
| 2,320,353 A | * | 6/1943 | Ernst .................. B23Q 5/56 74/89.42 |
| 2,596,419 A | | 5/1952 | Lowe et al. |
| 3,378,224 A | * | 4/1968 | Boyle .................. F16K 31/143 251/14 |
| 3,761,053 A | * | 9/1973 | Bedo .................. F16K 1/38 251/122 |

(Continued)

FOREIGN PATENT DOCUMENTS

EP    1419334 B1    11/2006
WO    2012087707 A1    6/2012

*Primary Examiner* — John Bastianelli
(74) *Attorney, Agent, or Firm* — Bryan Peckjian; SKF USA Inc. Patent Dept.

(57) ABSTRACT

A valve operator assembly is adapted for use with a valve. The assembly comprises a housing, an input member rotatably mounted with respect to the housing and comprising a rotational drive input, and a transmission mechanism connected to the input member and comprising a stem, the transmission mechanism being adapted to convert applied rotation of the rotational drive input into axial translation of the stem. The assembly further comprises at least one elastic actuator axially located between the input member and the stem to obtain a compression of the actuator during an axial translation of the stem towards the input member and a release of the actuator during an axial translation in the opposite direction.

15 Claims, 3 Drawing Sheets

(56) References Cited

U.S. PATENT DOCUMENTS

| | | | | |
|---|---|---|---|---|
| 3,765,642 | A * | 10/1973 | Nelson | F16K 31/143 251/14 |
| 3,976,279 | A * | 8/1976 | Walker | F16K 31/508 251/214 |
| 4,217,813 | A * | 8/1980 | Bradley | B62D 5/083 74/89.42 |
| 4,569,503 | A * | 2/1986 | Karr, Jr. | F16K 31/1221 137/556.3 |
| 4,586,392 | A * | 5/1986 | Nilsson | F16H 19/04 251/229 |
| 4,911,412 | A * | 3/1990 | Danko | F16K 31/50 251/264 |
| 5,195,721 | A * | 3/1993 | Akkerman | F16D 27/105 251/129.13 |
| 5,407,173 | A * | 4/1995 | Smith | F16K 1/14 251/214 |
| 6,131,479 | A * | 10/2000 | Butsch | F16H 25/2252 74/424.92 |
| 6,561,480 | B1 * | 5/2003 | Komiya | F16K 1/38 251/267 |
| 6,684,897 | B2 * | 2/2004 | Sundararajan | F16K 31/122 137/15.19 |
| 7,004,445 | B2 * | 2/2006 | Lymberopoulos | F16K 3/0254 137/77 |
| 7,690,624 | B2 * | 4/2010 | Ito | F16B 39/16 251/264 |
| 2004/0244515 | A1 | 12/2004 | Cox | |

* cited by examiner

VALVE OPERATOR ASSEMBLY WITH COMPENSATING ACTUATOR

CROSS REFERENCE TO RELATED APPLICATION

This is a United States National Stage Application claiming the benefit of International Application Number PCT/EP2013/065312 filed on 19 Jul. 2013 (19 Jul. 2013), which is incorporated herein by reference in its entirety.

FIELD OF THE INVENTION

The present invention relates to the fields of valves and manually operable valves, for instance gate valves, control or regulation valves or chokes valves. More particularly, the invention relates to a valve operator assembly for a gate valve.

BACKGROUND TO THE INVENTION

Valves are used in a variety of industries to control the flow of fluids. In particular, gate valves are used extensively in the oil and gas industry to control the flow of produced fluids at various stages of production. Most gate valves used in this industry comprise a valve body having a longitudinal flow bore and a transverse gate cavity that intersects the flow bore. A gate having a gate opening extending transversely therethrough is disposed in the gate cavity. A valve stem is provided for moving the gate between an open position, in which the gate opening is aligned with the flow bore, and a closed position, in which the gate opening is offset from the flow bore. The gate cavity of the valve body is covered by a bonnet having an axial bore through which passes the valve stem.

Such a gate valve is associated to a valve operator assembly for selectively driving the valve stem up and down in order to close and open the gate valve. A gate valve may be manually actuated. In this case, the valve operator assembly generally comprises a transmission mechanism to convert the rotational motion of a hand-wheel into axial motion of the valve stem. To quickly open and close the gate valve with a minimum number of turns, the transmission mechanism may be a ball screw mechanism or a planetary roller screw mechanism in order to reduce the operating torque, for instance manual hand-wheel torque or powered with electric drive for surface valves or with remote operating vehicle (ROV) or electric actuation for subsea valves. For more details, it is possible for example to refer to the patent EP-B1-1 419 334 (SKF).

A balance system is generally provided on the valve body of the gate valve to prevent a back-driving of the transmission mechanism with the upward force exerted by the fluid. Under fluid pressure, the gate valve can effectively be inadvertently opened or closed. The balance system may comprise a balance stem disposed on the valve body and which is exposed to fluid pressure to offset or balance the force exerted on the gate.

When operating a gate valve without using such a balance stem, the force of the fluid helps in one direction a movement of the valve stem and the screw of the transmission mechanism whereas the force is against a movement in the opposite direction. For instance, when the valve is vertical and the drive input is uppermost, the upward force of the fluid helps an upwards movement of the valve stem and the screw. Accordingly, the required torque on the rotational drive input, such as manual hand-wheel, is usually much higher for the movements in one direction compared to the movements in the opposite direction.

SUMMARY OF THE INVENTION

One aim of the present invention is to overcome this drawback.

It is a particular object of the present invention to provide a valve operator assembly for valve, for instance gate valve, control or regulation valve or choke valve, wherein the required torque for manipulating the valve is limited.

In one embodiment, the valve operator assembly is provided for a valve comprising a valve body and a valve translating member axially moveable. The assembly comprises a housing adapted to be mounted on the valve, an input member rotatably mounted with respect to the housing and comprising a rotational drive input, and a transmission mechanism connected to the input member and comprising a translating element adapted to be connected to the valve translating member of the valve. The transmission mechanism is adapted to convert applied rotation of the rotational drive input into axial translation of the translating element. The assembly further comprises at least one elastic actuator axially located between the input member and the translating element to obtain a compression of the actuator during an axial translation of the translating element towards the input member and a release of the actuator during an axial translation in the opposite direction.

Preferably, the elastic actuator bears axially against the translating element. The elastic actuator may be coaxial with an axis of the translating element. In one embodiment, the elastic actuator comprises at least one compression spring.

The transmission mechanism and the input member may delimit together a space inside which is disposed the elastic actuator. The transmission mechanism may further comprise at least one thrust rolling bearing mounted on the input member, the elastic actuator bearing axially against the thrust rolling bearing.

Alternatively, the transmission mechanism and the housing may delimit together a space inside which is disposed the elastic actuator. The elastic actuator may bear axially against a protrusion of the housing.

In one embodiment, the transmission mechanism comprises a screw, a nut surrounding and coaxial with the screw, and a plurality of rolling elements radially disposed between the screw and the nut and each engaged in both outer and inner threads provided on the screw and the nut.

In one embodiment, the screw forms the translating element and the nut is connected to the input member. Alternatively, the nut may form the translating element and the screw is connected to the input member.

Preferably, a contact diameter $D_{contact}$ between the rolling elements and the screw or the nut is defined by:

$$D_{contact} \geq \frac{L}{\pi \times \tan(\Phi)}$$

with L corresponding to the lead of the screw mechanism, and with $\Phi$ corresponding to a determined non-back-driving factor which is chosen from $0° < \Phi \leq 1°$, the contact diameter being provided in order to prevent back-driving of the mechanism.

The non-back-driving factor may be chosen from $0° < \Phi \leq 0.5°$, and preferably chosen from $0° < \Phi \leq 0.4°$.

In one embodiment, the contact diameter is provided between the rolling elements and the nut when the rolling elements are rollers and the rollers axially move together with the screw with respect to the nut. In another embodiment, the contact diameter is provided between the rolling elements and the screw when the rolling elements are rollers and the rollers axially move together with the nut with respect to the screw.

In another embodiment, the contact diameter is provided between the rolling elements and the screw when the rolling elements are rollers and comprises grooves into which are engaged the outer thread of the screw and the inner thread of the nut, the rollers axially moving with respect to the screw and the nut.

In another embodiment, the contact diameter is provided between the rolling elements and the screw when the rolling elements are balls.

In one embodiment, the valve operator assembly further comprises at least one rolling bearing radially disposed between the transmission mechanism and the housing. The rolling bearing may be mounted on an outer surface of the transmission mechanism.

Advantageously, the input member comprises an adapter sleeve connected to the transmission mechanism and the rotational drive input connected to the sleeve.

The invention also relates to a valve, notably a gate valve, a control or regulation valve or a choke valve comprising a valve body, a valve translating member axially moveable and a valve operator assembly as previously defined. The valve translating member may be a valve stem or a piston for instance.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE PRESENT INVENTION

Figure 1:
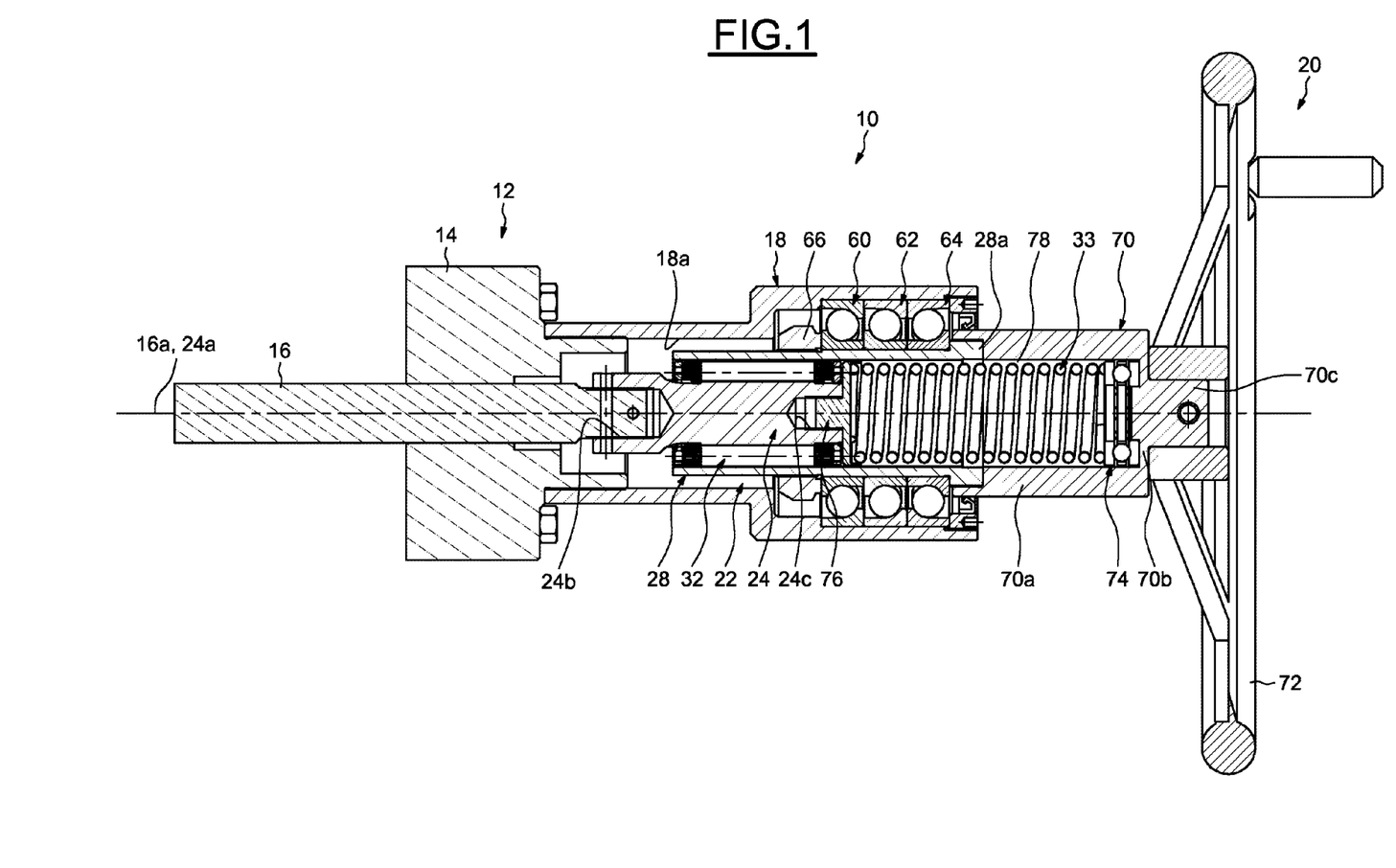
FIG. 1 is a cross-section of a valve operator assembly for gate valve according to a first example of the invention.

A valve operator assembly 10 as shown on FIG. 1 is adapted for a gate valve 12 provided with a bonnet 14, a valve body (not shown) covered by the bonnet and a moveable valve stem 16 with an axis 16a. Conventionally, the valve body has a flow bore and a transverse gate cavity that intersects the flow bore. The gate valve also comprises a gate having a gate opening extending transversely therethrough is disposed in the gate cavity. For more detail on such a gate valve, it could be referred to EP-B1-1 419 334 (SKF) which is hereby incorporated by reference.

The valve operator assembly 10 comprises a tubular housing 18 mounted on the bonnet 14 of the gate valve, an input member 20 rotatably mounted with respect to the housing, and an inverted roller screw mechanism 22 interposed between the input member and the valve stem 16 of the valve to convert a rotational motion of the input member 20 into axial motion of the valve stem. The inverted roller screw mechanism 22 is mounted into a bore 18a of the housing and is connected to the input member 20. One axial end of the housing 18 is secured to the bonnet 14 by threads (not referenced). In the illustrated example, the bore 18a has a stepped form.

Figure 2:
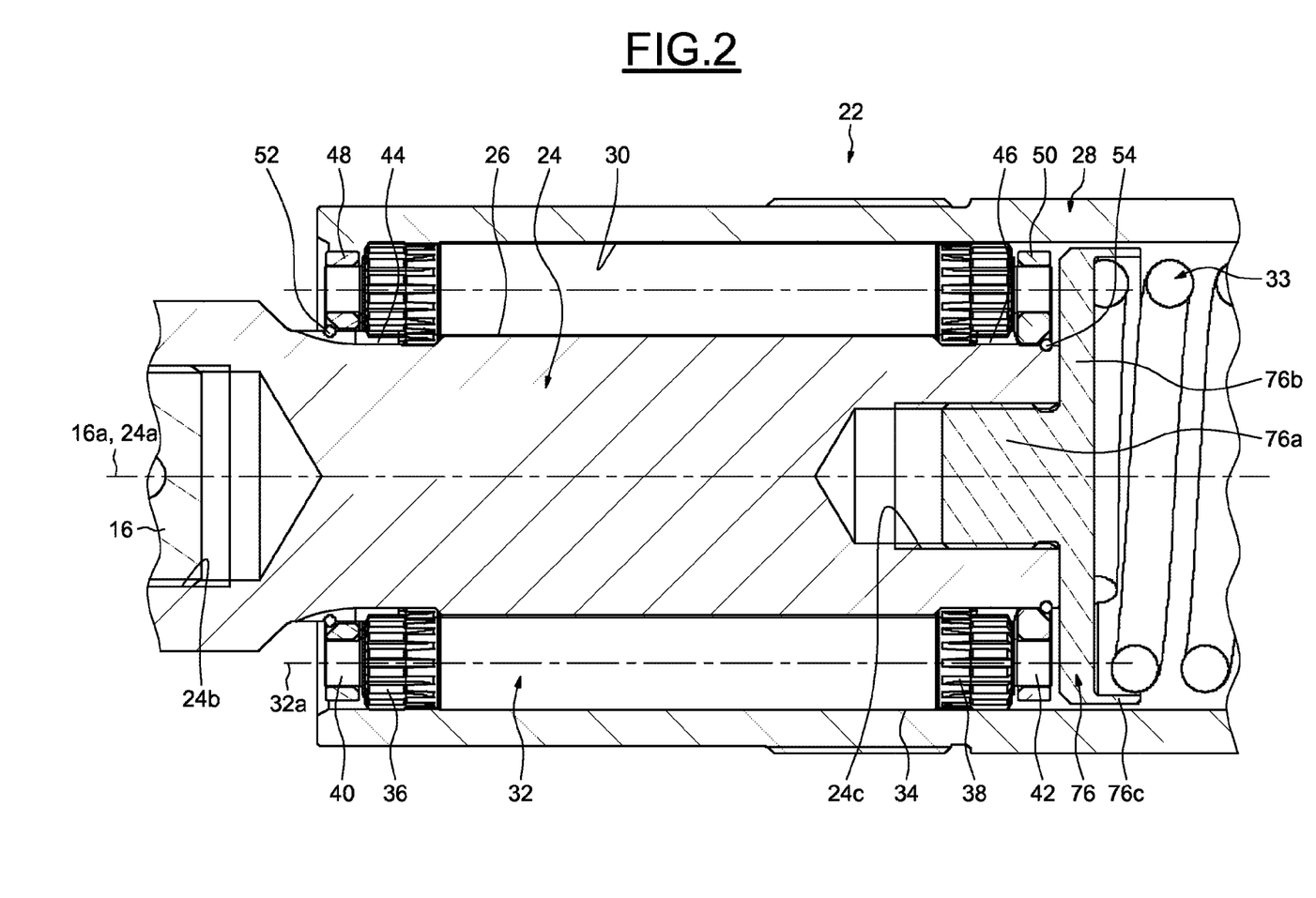
FIG. 2 is a cross-section of an inverted roller screw mechanism of the assembly of FIG. 1.

As shown more clearly on FIG. 2, the mechanism 22 comprises a screw 24, with an axis 24a coaxial with the axis 16a of the valve stem 16, provided with an outer thread 26, a nut 28 mounted coaxially about the screw 24 and provided with an inner thread 30, the internal diameter of which is greater than the external diameter of the outer thread 26, and a plurality of longitudinal rollers 32 arranged radially between the screw 24 and the nut 28. As will be described later, the mechanism 22 further comprises an elastic spring 33 to decrease the required applied torque on the input member 20 during the translation of the screw 24 toward the gate valve 12.

The screw 24 extends longitudinally through a cylindrical bore of the nut 28 on elongated to accommodate the full extent of screw travel. Axially on the side opposite to the input member 20 (FIG. 1), a recess 24b is formed on a frontal radial surface of the screw 12 and into which is fixed an end of the valve stem 16 of the gate valve. The valve stem 16 is connected to the screw 24 by any appropriate means, for example by threads and/or a pin.

The rollers 32 are identical to each other and are distributed regularly around the screw 24. Each roller 32 extends along an axis 32a which is coaxial with the axis 24a of the screw and comprises an outer thread 34 engaging the thread 26 of the screw and the thread 30 of the nut. Each roller 20 also comprises, at each axial end, outer gear teeth 36, 38 extending axially outwards the outer thread 34 and which are themselves extended axially by a cylindrical stud 40, 42 extending outwards. Each gear teeth 36, 38 are axially located between the associated stud 40, 42 and the outer thread 34. The outer thread 34 of each roller is axially located between the two gear teeth 36, 38.

The roller screw mechanism 22 also comprises two annular gear wheels 44, 46 provided on the outer surface of the screw 24 and each comprising outer gear teeth meshing the gear teeth 36, 38 respectively of the rollers 32 for the synchronization thereof. Each gear wheel 44, 46 is axially located near to an end of the outer thread 26 of the screw. The outer thread 26 is axially located between the two gear wheels 44, 46. In the disclosed embodiment, the gear wheels 44, 46 are formed directly on the outer surface of the screw 24. Alternatively, the gear wheels may be separate parts which are fixed onto the screw 24.

The mechanism 22 further comprises two annular guides or spacer rings 48, 50 disposed on the outer surface of the screw 24. The spacer rings 48, 50 are radially disposed between the screw 24 and the inner thread 30 of the nut without contact with the thread. Each spacer ring 48, 50 is mounted on the outer surface of the screw 24 axially next to the associated gear wheel 44, 46. Each spacer ring 48, 50 is axially offset towards the outside of the nut 28 with regard to the associated gear wheel 44, 46. Each spacer ring 48, 50 comprises a plurality of cylindrical through-recesses (not referenced) which are distributed regularly in the circumferential direction and inside which the studs 40, 42 of the rollers are housed. The spacer rings 48, 50 enable the rollers 32 to be carried and the regular circumferential spacing thereof to be kept. The mechanism 22 further comprises elastic retainer rings 52, 54 each mounted in a groove (not referenced) formed on the outer surface of the screw 24 in order to axially hold the corresponding spacer ring 48, 50.

Referring once again to FIG. 1, the valve operator assembly 10 further comprises rolling bearings 60 to 64 to guide the rotation of the nut 28 of the inverted roller screw mechanism. The rolling bearings 60 to 64 are radially mounted between the outer surface of the nut 28 and the stepped bore 18a of the housing. The rolling bearings 60 to 64 are mounted radially in contact with the outer surface of the nut 28 and a large diameter portion of the stepped bore 18a of the housing. In the disclosed example, the rolling bearings 60 to 64 are angular contact thrust ball bearings and are disposed axially in contact one to another. A retaining ring 66 is secured on the outer surface of the nut 28 and axially bears against the rolling bearing 60. Axially on the opposite side, the rolling bearing 64 is axially mounted against a flange 28a of the nut 28 extending radially outwards the outer surface of the nut. The flange 28a is axially located at an axial end of the nut.

The input member 20 comprises an adapter sleeve 70 mounted on the nut 28 and an operable hand-wheel 72 secured to the sleeve. The hand-wheel 72 forms a rotational drive input. The sleeve 70 comprises an annular axial portion 70a secured to the flange 28a of the nut by any appropriate means, for example by threads, a radial portion 70b extending radially inwards the axial portion 70a, and a pin 70c projecting axially outwards from the radial portion 70b and onto which is secured the hand-wheel 72. The axial portion 70a bears axially against the end of of the nut 28. Sealing means (not referenced) are provided between the axial portion 70a of the sleeve and the bore of the housing 18.

The mechanism 22 further comprises a thrust rolling bearing 74 mounted on the adapter sleeve 70 and a centering plate 76 mounted on the screw 24. The thrust rolling bearing 74 is axially disposed into the bore of the axial portion 70a of the adapter sleeve and axially bears against the radial portion 70b. In the disclosed example, the thrust rolling bearing 74 is a thrust ball bearing.

As shown more clearly on FIG. 2, the centering plate 76 comprises a pin 76a mounted into a recess 24c formed on a frontal radial surface of the screw axially on the side opposite to the recess 24b. The pin 76a is connected to the screw 24 by any appropriate means, here by threads. The centering plate 76 further comprises an annular radial portion 76b extending radially outwards the pin 76a and bearing axially against the end of the screw 24, and an annular axial flange 76b extending axially the radial portion 76b on the side opposite to the screw 24. The radial portion 76b and the axial flange 76c are located near to the thread 30 of the nut while remaining distant from the latter.

Referring once again to FIG. 1, the elastic spring 33 is located axially between the input member 70 and the screw 24 of the inverted roller screw mechanism. The spring 33 is coaxial with the axis 24a of the screw. The spring 33 is disposed inside a closed space 78 delimited by the mechanism 22 and the input member 70. The spring 33 is disposed inside the bore of the nut 28 and the bore of the axial portion 70a of the adapter sleeve. The space 78 is axially delimited by the radial portion 70b of the adapter sleeve and the centering plate 76. A first end of the spring 33 axially bears against the centering plate 76. The spring 33 axially bears against the screw 24 with the interposition of the centering plate 76. The first end of the spring 33 axially comes into contact with the radial portion 76b of the plate. The flange 76c of the plate radially surrounds the end. A second opposite end of the spring 33 axially bears against the thrust rolling bearing 74. The spring 33 axially bears against the input member 20 with the interposition of the thrust rolling bearing 74. In the illustrated example, the spring 33 is a compression spring. The spring 33 has in cross-section a circular profile. Alternatively, the spring may have in cross-section a different profile, for example a square one.

When an operator applies a torque on the hand-wheel 72, this torque is transmitted to the adapter sleeve 70 and then to the nut 28 of the inverted roller screw mechanism. With the rotation of the nut 28, the rollers 32 rotate on themselves about the screw 24 and move axially and additionally rotate in the nut 28. The rollers 32 are rotationally guided by outer gear wheels 44, 46 provided on the screw and meshing with the gear teeth of the rollers. Both the rollers 32 and the screw 12 are axially or longitudinally moveable into the nut 28. Accordingly, the rotational motion of a hand-wheel 72 is converted into an axial motion of the valve stem 16 of the valve gate.

When the operator applies a torque on the hand-wheel 72 in order that the screw 24 moves axially towards the hand-wheel, the elastic spring 33 is axially compressed between the input member 20 and the screw. The compression of the spring 33 slightly increases the required torque on the hand-wheel 72 but in an affordable way since the force exerted by the fluid on the valve stem 16 of the valve gate helps the displacement of the screw 24 towards the input member 20. When the operator applies an opposite torque on the hand-wheel 72, the screw 24 axially moves in the opposite direction, i.e. towards the outside of the mechanism 22 in the direction of the valve gate 12. In this case, the spring 33 releases the stored energy during the compression and exerts an axial force on the screw 24 which is directed toward the screw. Accordingly, the required torque on the hand-wheel 72 is significantly decreased. The spring 33 counters the force exerted by the fluid on the valve stem 16 of the valve gate. This effect will help since normal screw operation is done with direct torque is this movement. Direct torque is always higher than indirect torque.

The spring 33 is configured to bias the screw 24 toward the valve stem 16 of the valve gate. When the screw 24 moves axially towards the input member 70, the spring 33 is compressed and loaded between the input member and the screw. When the screw 24 moves axially in the opposite direction, the spring 33 is released and an axial force is applied on the screw to counteract against the force exerted by the fluid.

Besides, with the use of the inverted roller screw mechanism 22, a limited applied torque is required on the hand-wheel 72 in order to actuate the valve stem 16. Furthermore, the required torque is limited since lead of the screw 24 is preferably selected with small values as described later. The load capacity of the valve operator assembly 10 is increased since the inverted roller screw mechanism thread geometry can be larger than with a conventional roller screw since there is no minimum member of starts required. This increases load capacity while keeping compactness advantage. The lifetime of the assembly 10 is also increased. Otherwise, the required space for the assembly 10 is reduced. Besides, thanks to the disposition of the rolling bearings 60 to 64 directly on the outer surface of the nut 28 of the inverted roller screw mechanism, the radial dimension of the valve operator assembly 10 is further decreased.

In order to avoid back-drive of the inverted roller screw mechanism 22 under fluid pressure on the valve gate, the contact diameter $D_{contact}$ between the rollers 32 and the nut 28 in mm is advantageously defined by:

$$D_{contact} \geq \frac{L}{\pi \times \tan(\Phi)}$$

with L corresponding to the lead of the inverted roller screw mechanism, and with Φ corresponding to a determined non-back-driving factor which is chosen from 0°<Φ≤1°. The lead is the axial travel per turn. The contact diameter is equal to the diameter on thread flanks of the nut where rollers 32 are in contact.

With such a contact diameter $D_{contact}$ between the rollers 32 and the nut 28, the indirect efficiency of the inverted roller screw mechanism 22 equals zero or is very close to zero. The indirect efficiency defines the axial load required to transform the translation of the screw 24 into a rotation of the nut 28.

As previously indicated the non-back-driving factor Φ is greater than 0° and less than or equal to 1°. With a non-back-driving factor Φ less than or equal to 0.4°, the prevention of the back-driving of the inverted roller screw mechanism 22 is guaranteed. Accordingly, under fluid pressure exerted both on the valve stem 16 and the screw 24, the mechanism 22 is not reversible or back-driveable. The force exerted by the fluid is not transformed into a rotation of the nut 28. The mechanism 32 is not reversible even with an optimal and minimum internal friction created into the mechanism and/or into the assembly.

With a non-back-driving factor Φ greater than 0.4° and less than or equal to 0.5°, the indirect efficiency of the inverted roller screw mechanism 22 is very close to zero and the prevention of the back-driving of the inverted roller screw mechanism 22 is obtained with the internal friction created into the mechanism which generates a braking torque preventing the rotation of the nut 28 under an axial load exerted by the fluid on the screw 24. With a non-back-driving factor Φ greater than 0.5° and less than or equal to 1°, the prevention of the back-driving of the inverted roller screw mechanism 22 may also obtained with the internal friction created into the mechanism and/or into the assembly 10.

Otherwise, with a mechanism 22 not back-driveable or almost not back-driveable, the required torque for moving the screw 24 towards the input member 20 is reduced since the indirect efficiency of the mechanism equals or is very close to zero.

Preferably, for a valve operator assembly 10 used with a surface valve gate and with a subsea valve gate, the lead of the inverted roller screw mechanism 22 may be respectively from 1 to 8 mm, and from 1 to 25 mm. The number of starts of the screw thread may be advantageously from 1 to 5 and preferably equal to 2 or 3. Preferably, the number of starts of the nut thread is equal to the one of the screw thread. Preferably, the outer thread of each roller 36 has only one start.

The contact diameter $d_{contact}$ between the rollers 32 and the screw 24 in mm is advantageously defined by:

$$d_{contact} \geq \frac{N \times L}{[(N \times 2) \times \pi \times \tan(\Phi)]}$$

with N corresponding to the number of starts of the screw thread, with L corresponding to the lead of the inverted roller screw mechanism in mm, and with Φ corresponding to the determined non-back-driving factor. The contact diameter is equal to the diameter on thread flanks of the screw where rollers 32 are in contact.

With a roller screw mechanism that cannot backdrive, the generating torque will be reduced to only overcome some international friction, from the rolling bearings 60 to 64 or the sealing means for instance. Torque to operate the screw 24 in this configuration is almost zero. With a roller screw mechanism that can backdrive, the required torque is still low since the assembly will be actuated in indirect mode. Then, the torque to drive in the pressure direction is limited to indirect torque which depends on load applied, friction torque and spring compression.

Figure 3:
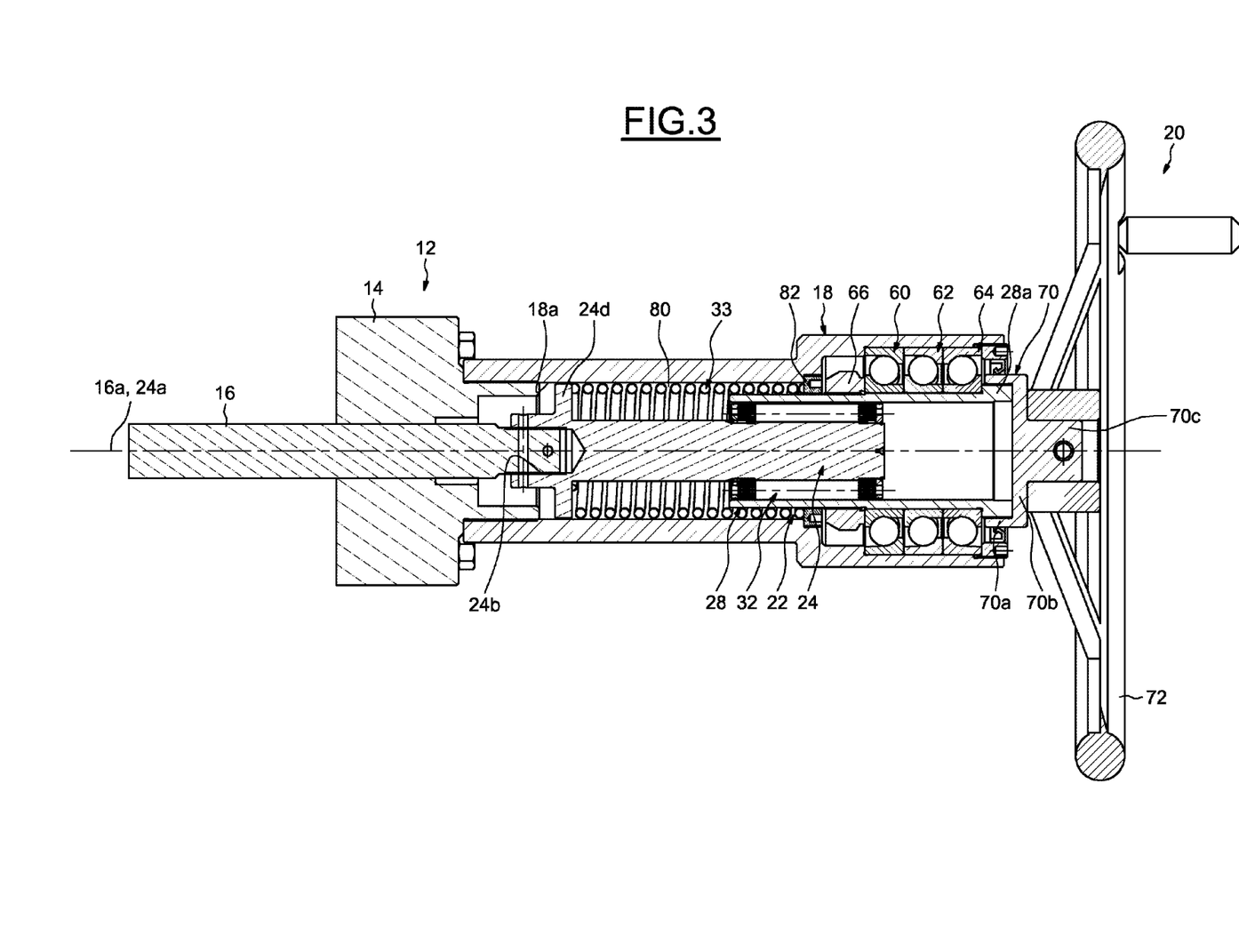
FIG. 3 is a cross-section of a valve operator assembly according to a second example of the invention.

In the second example illustrated on FIG. 3, in which identical parts are given identical references, the elastic spring 33 is located axially between the screw 24 of the inverted roller screw mechanism and a ring 82 secured to the stepped bore of the housing 18 and radially surrounding the nut 28 of the mechanism. The ring 82 forms on the housing 18 a protrusion extending radially inwards. Alternatively, the housing 18 and the ring 32 may be made in one part. The ring 82 is axially located near to the retaining ring 66 axially on the opposite side to the rolling bearing 60. The elastic spring 33, coaxial with the axis 24a of the screw, is disposed into a closed space 80 delimited by the inverted roller screw mechanism 22 and the housing 18. The spring 33 is disposed inside the bore of the housing 18 and radially surrounds the nut 28. The outer surface of the nut forms a centering portion for the spring 33. The spring 33 extends axially beyond the end of the nut 28. The space 80 is axially delimited by the ring 82 and by a radial flange 24d extending from the outer surface of the screw. The radial flange 24d is axially located near to the recess 24b. The first end of the spring 33 axially bears against the flange 24d and the second opposite end axially comes into contact with the ring 82. The spring 33 is disposed in a small diameter portion of the stepped bore 18 of the housing. In use, the spring 33 acts in the same way that in the first example previously described. In this example, the adapter sleeve 70 has a reduced length and the radial portion 70b axially bears against the end of the nut.

In the illustrated examples, one compression spring is used to exert a preload axial force on the screw forming a translating stem. Alternatively, it is also possible to provide another mechanical actuator such as elastic torsion spring or axially elastic washers which may be stacked. The washers may be of the Belleville type. Alternatively, it is also possible to have multiple springs having or not different stiffness and assembled coaxial to each other, or parallel or in serial arrangement. It is also possible to combine the spring arrangement as disclosed in the first example together with the spring arrangement as disclosed in the second example.

The invention has been illustrated on the basis of a valve operator assembly for gate valve comprising an inverted roller screw mechanism having a translating screw and a rotating nut connected to the input member. The invention can also applied to a screw mechanism having a translating nut connected to the valve stem and a rotating screw. In this case, the actuator acts on the nut. The invention can also be applied to a valve operator assembly having other type of roller screw mechanism such as standard planetary roller screw mechanism wherein the rollers axially move together with the nut with respect to the screw, or standard recirculating roller screw mechanism or inverted recirculating roller screw mechanism wherein the rollers comprises grooves into which are engaged the threads of the screw and the nut and axially move with respect to the screw and nut. In these three cases, if it is necessary to obtain a not reversible or back-driveable mechanism, the contact diameter $D_{contact}$ as previously defined has to been provided between the rollers and the screw rather than between the rollers and the nut. The invention can also be applied to a valve operator assembly having a standard or an inverted ball screw mechanism. To prevent back-driving of the standard or inverted ball screw mechanism, the contact diameter $D_{contact}$ as previously defined has to been provided between the balls and the screw. Otherwise, the invention can also be applied to a valve operator assembly having other type of transmission mechanism adapted to convert a rotation into a linear movement, for instance a directed threaded connection. However, such transmission mechanism requires large actuation forces and is not reversible or not back-driveable if necessary.

Although the invention has been illustrated on the basis of a valve operator assembly for gate valve, it should be understood that the invention can also be used with other types of valves, for instance control or regulation valves or choke valves. The valve operator assembly may be used for instance with a surface gate or a subsea valve gate which may be actuated by a remote operating vehicle (ROV).

The invention claimed is:

1. A valve operator assembly for a valve comprising a valve body and a valve translating member axially moveable, the assembly comprising:
   a housing adapted to be mounted on the valve;
   an input member rotatably mounted with respect to the housing and comprising a rotational drive input;
   a transmission mechanism connected to the input member and comprising a translating element adapted to be connected to the valve translating member of the valve,
   wherein the transmission mechanism is adapted to convert applied rotation of the rotational drive input into axial translation of the translating element;
   at least one elastic actuator axially located between the input member and the translating element to obtain a compression of the elastic actuator during an axial translation of the translating element towards the input member and a release of the elastic actuator during an axial translation in the opposite direction; and
   the transmission mechanism further comprising:
   a screw,
   a nut surrounding and coaxial with said the screw, and
   a plurality of rolling elements radially disposed between the screw and the nut and each engaged in both outer and inner threads provided on the screw and the nut; and
   wherein a contact diameter ($D_{contact}$) between the rolling elements and the screw or the nut is defined by:

$$D_{contact} \geq \frac{L}{\pi \times \tan(\Phi)}$$

wherein L corresponds to the lead of the screw mechanism, and
   wherein $\Phi$ corresponds to a determined non-back-driving factor which is chosen from $0° < \Phi \leq 1°$, the contact diameter being provided in order to prevent back-driving of the mechanism.

2. The valve operator assembly according to claim 1, wherein the elastic actuator bears axially against the translating element.

3. The valve operator assembly according to claim 1, wherein the elastic actuator is coaxial with an axis (24a) of the translating element.

4. The valve operator assembly according to claim 1, wherein the elastic actuator comprises at least one compression spring.

5. The valve operator assembly according to claim 1, wherein the transmission mechanism and the input member delimit together a space (78) inside which is disposed the elastic actuator.

6. The valve operator assembly according to claim 5, wherein the transmission mechanism further comprises at least one thrust rolling bearing mounted on the input member, the elastic actuator bearing axially against the thrust rolling bearing.

7. The valve operator assembly according to claim 1, wherein the transmission mechanism and the housing delimit together a space inside which is disposed the elastic actuator.

8. The valve operator assembly according to claim 7, the elastic actuator bears axially against a protrusion of the housing.

9. The valve operator assembly according to claim 1, wherein one of the screw or the nut forms the translating element.

10. The valve operator assembly according to claim 1, wherein the non-back-driving factor is chosen from $0° < \Phi \leq 0.5°$.

11. The valve operator assembly according to claim 1, further comprising at least one rolling bearing radially disposed between the transmission mechanism and the housing.

12. The valve operator assembly according to claim 11, wherein the rolling bearing is mounted on an outer surface of the transmission mechanism.

13. The valve operator assembly according to claim 1, the input member further comprising an adapter sleeve connected to the transmission mechanism and the rotational drive input connected to the sleeve.

14. The valve comprising:
   a valve body;
   a valve translating member axially moveable; and
   a valve operator assembly, comprising:
   a housing adapted to be mounted on the valve;
   an input member rotatably mounted with respect to the housing and comprising a rotational drive input;
   a transmission mechanism connected to the input member and comprising a translating element adapted to be connected to the valve translating member of the valve,
   wherein the transmission mechanism is adapted to convert applied rotation of the rotational drive input into axial translation of the translating element;
   at least one elastic actuator axially located between the input member and the translating element to obtain a compression of the elastic actuator during an axial translation of the translating element towards the input member and a release of the elastic actuator during an axial translation in the opposite direction; and
   the transmission mechanism further comprising:
   a screw,
   a nut surrounding and coaxial with said the screw, and
   a plurality of rolling elements radially disposed between the screw and the nut and each engaged in both outer and inner threads provided on the screw and the nut; and
   wherein a contact diameter ($D_{contact}$) between the rolling elements and the screw or the nut is defined by:

$$D_{contact} \geq \frac{L}{\pi \times \tan(\Phi)}$$

wherein L corresponds to the lead of the screw mechanism, and wherein $\Phi$ corresponds to a determined non-back-driving factor which is chosen from $0° < \Phi \leq 1°$, the contact diameter being provided in order to prevent back-driving of the mechanism.

15. The valve operator assembly according to claim 1, wherein the non-back-driving factor is chosen from $0° < \Phi \leq 0.4°$.

* * * * *